US009436986B2

(12) United States Patent
Shimizu

(10) Patent No.: US 9,436,986 B2
(45) Date of Patent: Sep. 6, 2016

(54) IMAGE PROCESSING APPARATUS AND IMAGE PROCESSING METHOD

(71) Applicant: FUJITSU LIMITED, Kawasaki-shi, Kanagawa (JP)

(72) Inventor: Seiya Shimizu, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 74 days.

(21) Appl. No.: 14/600,572

(22) Filed: Jan. 20, 2015

(65) Prior Publication Data

US 2015/0139499 A1 May 21, 2015

Related U.S. Application Data

(63) Continuation of application No. PCT/JP2012/072081, filed on Aug. 30, 2012.

(51) Int. Cl.
*G06K 9/00* (2006.01)
*G06T 5/50* (2006.01)
(Continued)

(52) U.S. Cl.
CPC ............. *G06T 5/50* (2013.01); *G06K 9/00791* (2013.01); *G06T 3/4038* (2013.01); *G06T 5/009* (2013.01);
(Continued)

(58) Field of Classification Search
CPC .......... G06T 2207/20208; G06T 2207/10004; G06T 2207/20221; G06T 2207/30252; G06T 5/009; G06T 5/50; G06T 5/002; G06T 5/008; G06T 5/006; G06T 5/20
USPC ........................................................ 382/104
See application file for complete search history.

(56) References Cited

U.S. PATENT DOCUMENTS

2001/0022858 A1\* 9/2001 Komiya .................... G06T 5/50
382/274
2002/0012004 A1\* 1/2002 Deering ................ G06T 3/0081
345/589

(Continued)

FOREIGN PATENT DOCUMENTS

EP 1115250 A1 7/2001
EP 2182485 A2 5/2010

(Continued)

OTHER PUBLICATIONS

International Search Report, mailed in connection with PCT/JP2012/072081 and mailed Nov. 13, 2012.

(Continued)

*Primary Examiner* — Ali Bayat
(74) *Attorney, Agent, or Firm* — Fujitsu Patent Center

(57) ABSTRACT

An image processing apparatus that obtains a synthesized image of a subject viewed from an arbitrary viewpoint includes a calculator, a storage, and a synthesizer. The calculator calculates a correction value for a pixel value of a pixel that partially constitutes the picked-up images on the basis of a brightness of each of the plurality of picked-up images. The storage stores the correction value for each of the pixels. The synthesizer obtains a pixel value of a pixel in the synthesized image that corresponds to the pixel that partially constitutes the picked-up images by correcting a pixel value of the pixel that partially constitutes the picked-up images on the basis of a positional relationship of the pixel in the picked-up images, a correspondence relationship between the picked-up images and the synthesized image, and the correction value, and thereby generates the synthesized image.

15 Claims, 17 Drawing Sheets

(51) Int. Cl.
*G06T 3/40* (2006.01)
*G06T 5/00* (2006.01)

(52) U.S. Cl.
CPC ............. *G06T 2207/10004* (2013.01); *G06T 2207/20208* (2013.01); *G06T 2207/20221* (2013.01); *G06T 2207/30252* (2013.01)

(56) References Cited

U.S. PATENT DOCUMENTS

| | | | |
|---|---|---|---|
| 2002/0015052 A1* | 2/2002 | Deering | G06T 3/0081 345/647 |
| 2002/0047901 A1* | 4/2002 | Nobori | B60R 1/00 348/149 |
| 2002/0196340 A1 | 12/2002 | Kato et al. | |
| 2003/0206179 A1* | 11/2003 | Deering | G06T 3/0081 345/589 |
| 2004/0184638 A1 | 9/2004 | Nobori et al. | |
| 2006/0023078 A1* | 2/2006 | Schmitt | H04N 5/32 348/222.1 |
| 2006/0203092 A1 | 9/2006 | Nobori et al. | |
| 2008/0144973 A1 | 6/2008 | Jin | |
| 2010/0110234 A1* | 5/2010 | Kaneko | G06T 11/60 348/241 |
| 2010/0245607 A1 | 9/2010 | Kawai et al. | |
| 2013/0141547 A1 | 6/2013 | Shimizu | |
| 2013/0287316 A1 | 10/2013 | Kaneko et al. | |

FOREIGN PATENT DOCUMENTS

| | | |
|---|---|---|
| JP | 10-320537 | 12/1998 |
| JP | 2002-027448 | 1/2002 |
| JP | 2002-312512 | 10/2002 |
| JP | 2002-324235 | 11/2002 |
| JP | 2006-173988 | 6/2006 |
| JP | 2008-28521 | 2/2008 |
| JP | 2010-113424 | 5/2010 |
| JP | 2010-239596 | 10/2010 |
| JP | 2010-252015 | 11/2010 |
| WO | 2012-017560 | 2/2012 |

OTHER PUBLICATIONS

EESR—Extended European Search Report dated Jul. 31, 2015 for corresponding European Patent Application No. 12883969.3.
Shusaku Okamoto et al., "Development of Parking Assistance System Using Virtual Viewpoint Image Synthesis", ITS WORLD CONGRESS; Nov. 1, 2000; pp. 1-8; XP002418339.

* cited by examiner

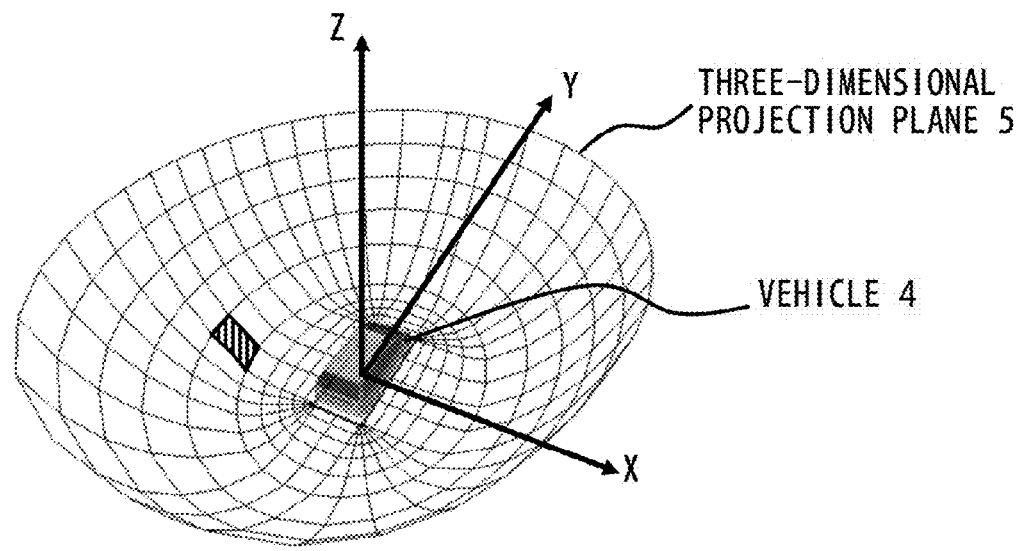
F I G. 5

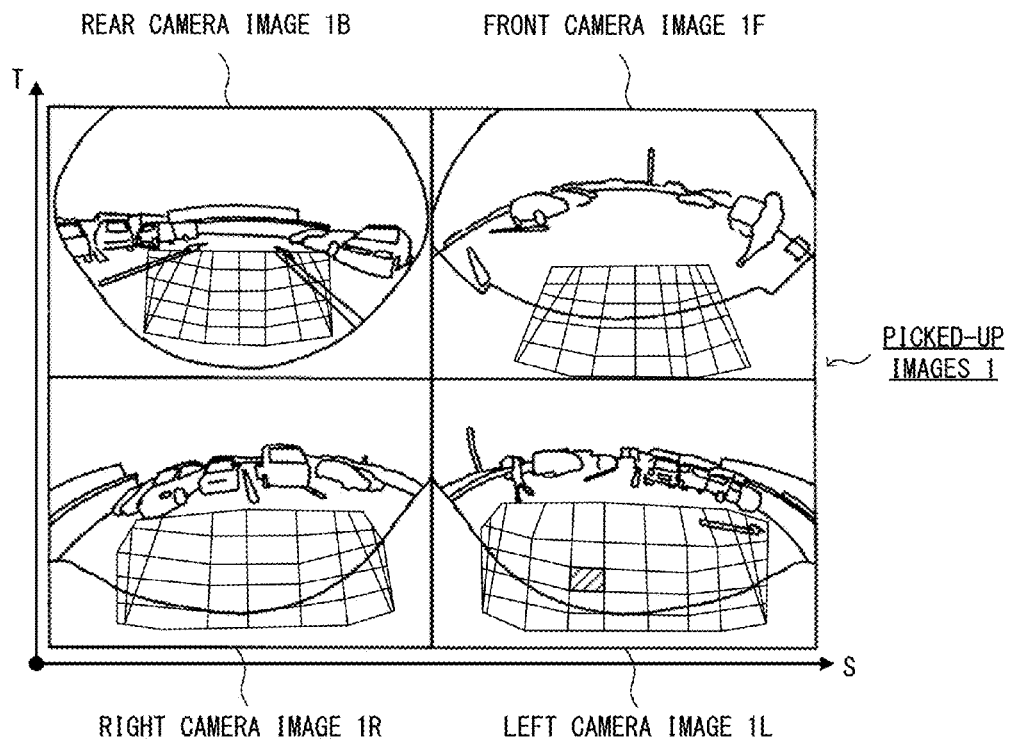
F I G. 6

| VERTEX ID | VERTEX COORDINATES IN PROJECTION PLANE | | | PIXEL COORDINATES IN PICKED-UP IMAGES | |
|---|---|---|---|---|---|
| | X | Y | Z | S | T |
| 1 | | | | | |
| 2 | | | | | |
| 3 | | | | | |
| 4 | | | | | |
| 5 | | | | | |
| 6 | | | | | |
| : | | | | | |

FIG. 7

| POLYGON ID | VERTEX ID |
|---|---|
| 1 | 1 |
|  | 2 |
|  | 4 |
|  | 3 |
| 2 | 3 |
|  | 4 |
|  | 6 |
|  | 5 |
| : |  |

FIG. 8

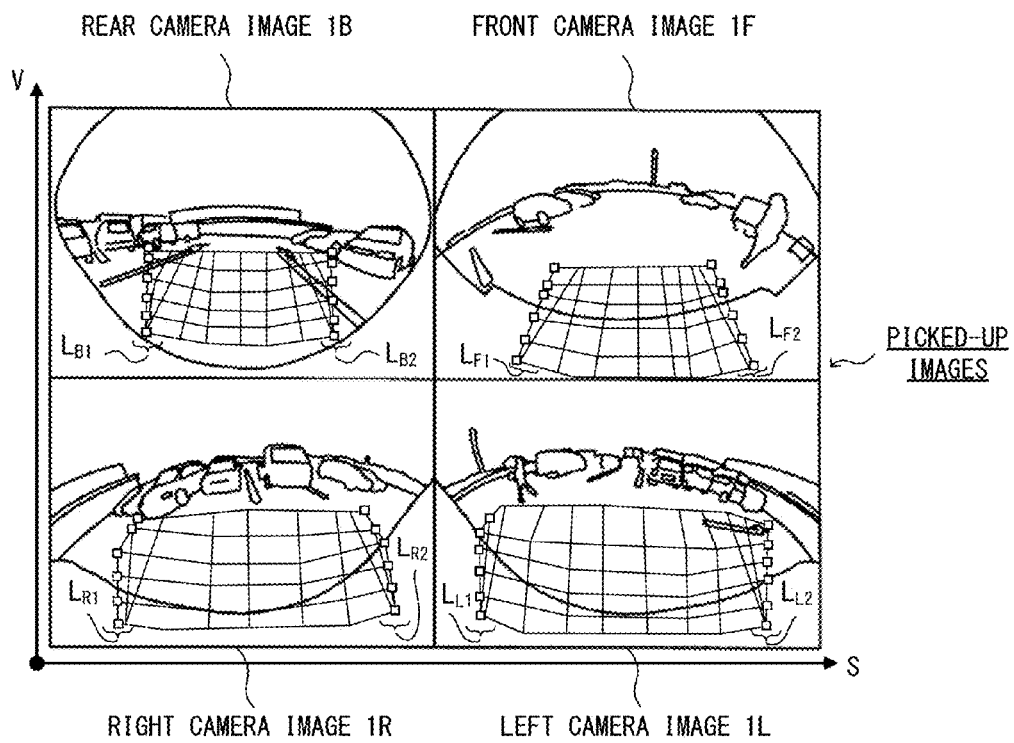
F I G. 10

| VERTEX ID | CORRECTION VALUE |
|---|---|
| 0 | $c_{B1}$ |
| 1 | $c_{B1}$ |
| ⋮ | ⋮ |
| 11 | $c_{B2}$ |
| 12 | $c_{B2}$ |
| ⋮ | ⋮ |
| | |
| | |
| | |

F I G. 1 2

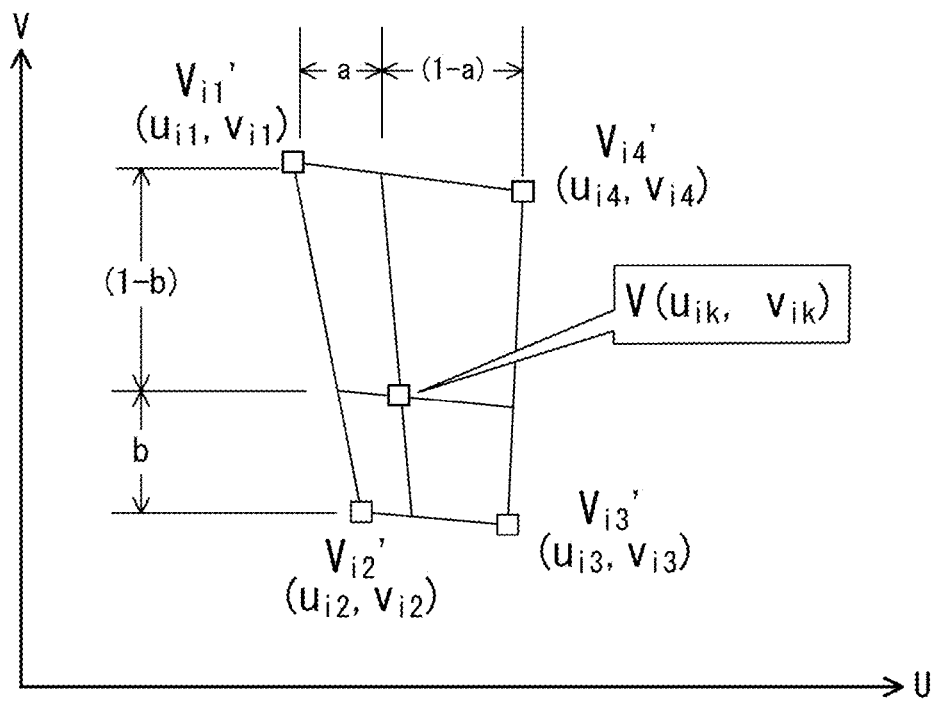
F I G. 14

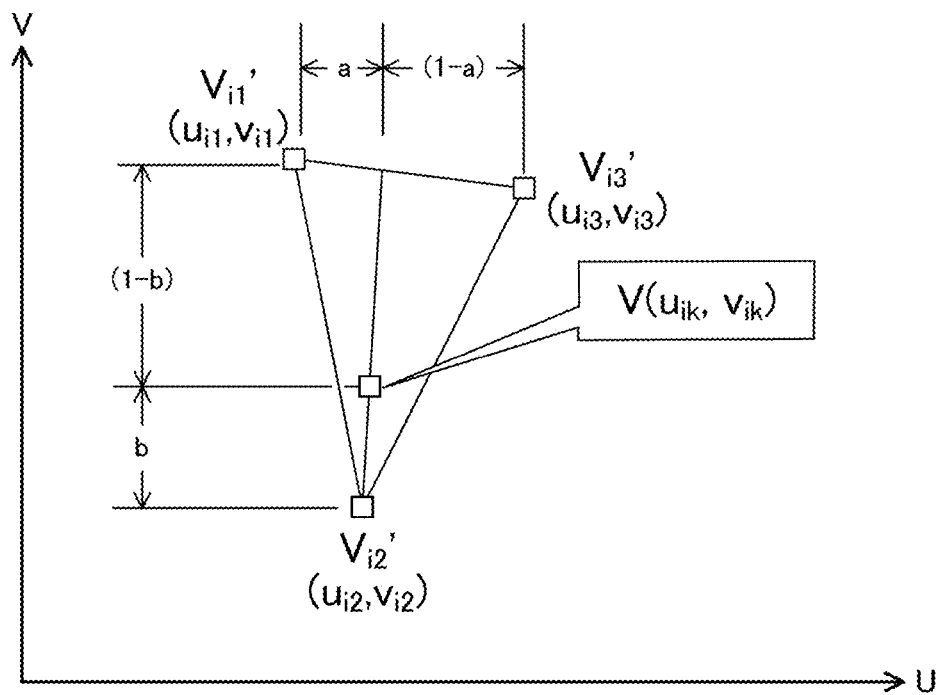
F I G. 15

IMAGE PROCESSING APPARATUS AND IMAGE PROCESSING METHOD

CROSS-REFERENCE TO RELATED APPLICATION

This application is a continuation application of International Application PCT/JP2012/072081 filed on Aug. 30, 2012 and designated the U.S., the entire contents of which are incorporated herein by reference.

FIELD

The embodiments discussed herein are related to an image processing technique.

BACKGROUND

Drive assist systems called around view monitors, wrap-around 3D monitors, etc. are known. This system uses a plurality of in-vehicle cameras installed in a vehicle to pick up images and synthesizes those images so as to display an image around the vehicle.

In this system, in-vehicle cameras respectively installed at the front, rear, right and left parts of a vehicle first pick up four images, a front camera image 1F, a rear camera image 1B, a left camera image 1L, and a right camera image 1R, respectively, as illustrated in FIG. 1. Then the drive assist system synthesizes these picked-up images 1 so as to generate and display an image that looks as if it were a result of taking the surroundings of the vehicle looking down from above, an example of which is illustrated as a looking-down image 2 in FIG. 2. In looking-down image 2, front camera image region 2F, rear camera image region 2B, left camera image region 2L, and right camera image region 2R are results of deforming partial regions in front camera image 1F, rear camera image 1B, left camera image 1L, and right camera image 1R, respectively.

In this system, when each camera independently performs control such as Automatic Gain Control (AGC) or the like, differences may be caused in brightness between the picked-up images 1 obtained by the respective cameras, sometimes resulting in a situation wherein differences in brightness cause discontinuous portions at the boundaries between the respective regions over the picked-up images 1 in the synthesized image. In the example illustrated in FIG. 2, discontinuous portions may occur at the boundaries, as depicted by the thick lines in the looking-down image 2, between front camera image region 2F, rear camera image region 2B, left camera image region 2L, and right camera image region 2R. Differences in brightness between the picked-up images 1 are eliminated by for example correcting the brightnesses of the picked-up images 1 obtained by the respective cameras on the basis of pixel values in the image regions in overlapping portions of viewing fields between the cameras. There are some known techniques for this purpose.

For example, as the first technique, a technique is known that generates a brightness-corrected image by using a correction coefficient calculated on the basis of pixel values in image regions of overlapping portions of input images, and generates a synthesized image from that corrected image so as to reduce discontinuity at boundaries. Also, for example, as the second technique, a technique is known that first performs viewpoint transformation on an input image for each camera, estimates correction coefficients, performs correction of overlapping regions in the images that received the viewpoint transformation, and synthesizes the corrected images (see Patent Documents 1 through 4 for example).

As a different background art, a technique is known that synthesizes camera images obtained by a plurality of cameras installed around a vehicle so as to generate a wrap-around image in which the virtual viewpoint can be changed arbitrarily (Patent Document 5 for example).

Patent Document 1: Japanese Laid-open Patent Publication No. 2002-27448
Patent Document 2: Japanese Laid-open Patent Publication No. 2006-173988
Patent Document 3: Japanese Laid-open Patent Publication No. 2008-28521
Patent Document 4: Japanese Laid-open Patent Publication No. 2010-113424
Patent Document 5: International Publication Pamphlet No. 2012/017560

According to the first and second techniques described above, correction is conducted on a picked-up image or a viewpoint-transformed image for each camera so as to complete the generating of corrected images, and thereafter the corrected images are synthesized. When this type of image processing is executed, an image memory for storing corrected images is used in addition to respective image memories for holding picked-up images or viewpoint-converted images and a synthesized image. Also, a capturing process of picked-up images or a viewpoint-converted image, a brightness correction process, and an image synthesization process that are executed in this image process are executed serially. A brightness correction process is a process executed on all pixels constituting picked-up images or a viewpoint-converted image, and an image synthesization process is started after the completion of a brightness correction process on all pixels. This elongates the latency between picking up of images by cameras and the displaying of the synthesized image when an image process as describe above is executed. Short latencies are preferable for drive assist apparatuses, for which driving safety is desired.

Also, as an example, a case is discussed in which a synthesized image is generated without conducting the brightness correction on images obtained by respective cameras and thereafter the brightness correction is conducted on the synthesized image. Because the synthesized image has not received brightness correction in this case, there are brightness differences at boundaries between picked-up images obtained from the cameras. In the image process in this case, calculation of correction values for eliminating brightness differences between pixels is performed for all pixels constituting the synthesized image and thereafter brightness correction is conducted on the synthesized image. Accordingly, when this type of an image process is conducted, an image memory is used for holding a synthesized image that has not received brightness correction. Also, it is not possible to perform calculation of correction values before the completion of the generating of the synthesized image in this image process and accordingly the latency between the obtainment of images by the cameras and the displaying of the synthesized image becomes longer. Also, when for example the viewpoint position has been changed in the synthesized image, the relationships between the positions, in the synthesized image, corresponding to boundaries between picked-up images obtained from the cameras also change, causing the need to recalculate correction values even when there are no brightness differences in the picked-up images obtained from the respective cameras.

SUMMARY

An image processing apparatus that will be discussed herein generates a synthesized image of a subject viewed from an arbitrary viewpoint from a plurality of picked-up images obtained by picking up surroundings of the subject in different directions. A type of this image processing apparatus includes a calculator, a storage and a synthesizer. The calculator calculates a correction value for a pixel value of a pixel that partially constitutes the picked-up images on the basis of a brightness of each of the plurality of picked-up images. The storage stores the correction value calculated by the calculator for each of the pixels. The synthesizer generates the synthesized image by obtaining a pixel value of a pixel in the synthesized image that corresponds to the pixel that partially constitutes the picked-up images. Also, the synthesizer corrects a pixel value of the pixel that partially constitutes the picked-up images on the basis of a positional relationship of the pixel in the picked-up images, a correspondence relationship between the picked-up images and the synthesized image, and the correction value stored in the storage, and thereby obtains a pixel value of a pixel in a wrap-around image.

The object and advantages of the embodiment will be realized and attained by means of the elements and combinations particularly pointed out in the claims.

It is to be understood that both the foregoing general description and the following detailed description are exemplary and explanatory and are not restrictive of the embodiment.

BRIEF DESCRIPTION OF DRAWINGS

FIG. 5 illustrates an example of the shape of a three-dimensional projection plane;

FIG. 6 illustrates an example of picked-up images stored in an input image frame buffer;

FIG. 7 illustrates an example of a data structure of a vertex data table;

FIG. 8 illustrates an example of a data structure of a polygon data table;

FIG. 10 illustrates procedures of the generating of a brightness correction table (first);

FIG. 12 illustrates an example of a data structure of the brightness correction table;

FIG. 14 explains the image synthesization process including brightness correction on picked-up images (second);

FIG. 15 explains the image synthesization process including brightness correction on picked-up images (third);

DESCRIPTION OF EMBODIMENTS

Figure 3:
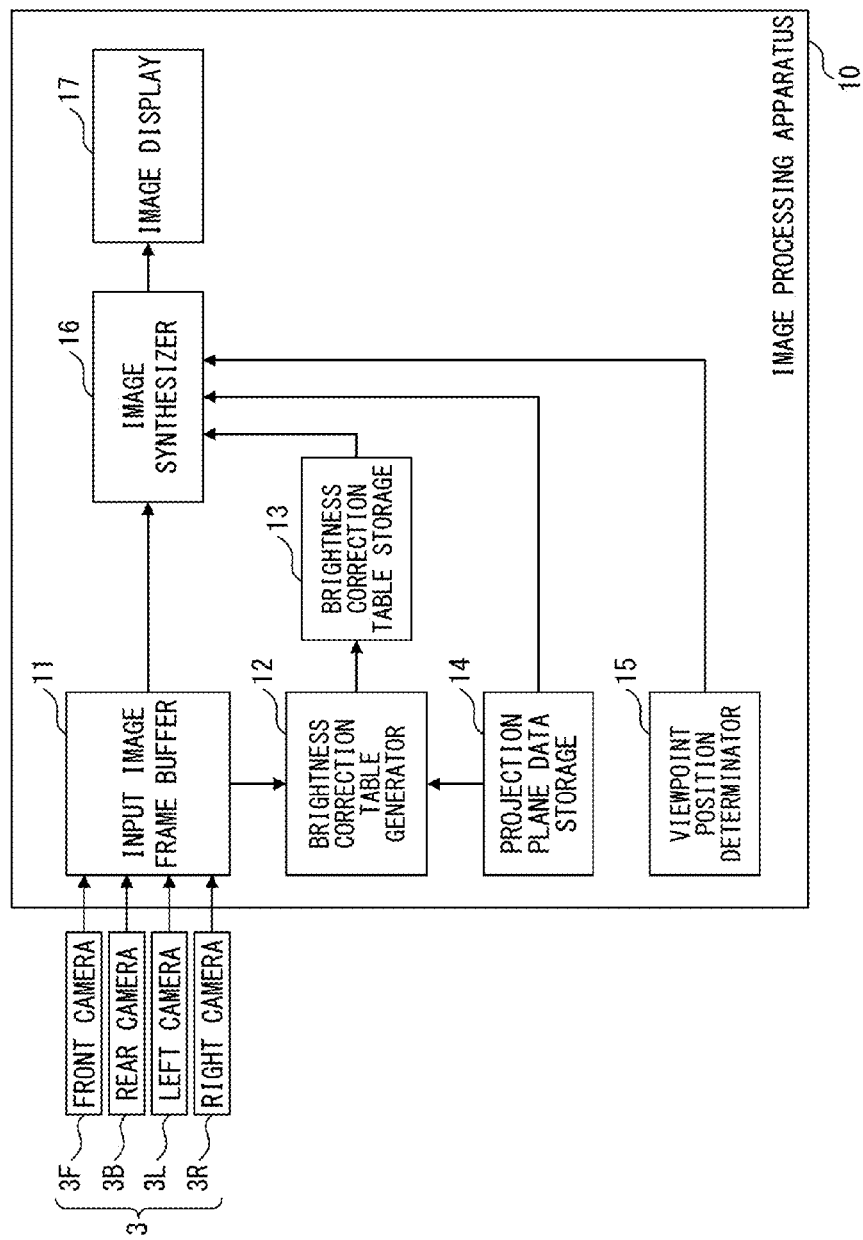
FIG. 3 is a block diagram of a configuration of an example of a drive assist system.

First, FIG. 3 will be explained. FIG. 3 is a block diagram illustrating a configuration of an example of a drive assist system.

This drive assist system employs a configuration in which four cameras are connected to an image processing apparatus 10.

Figure 1:
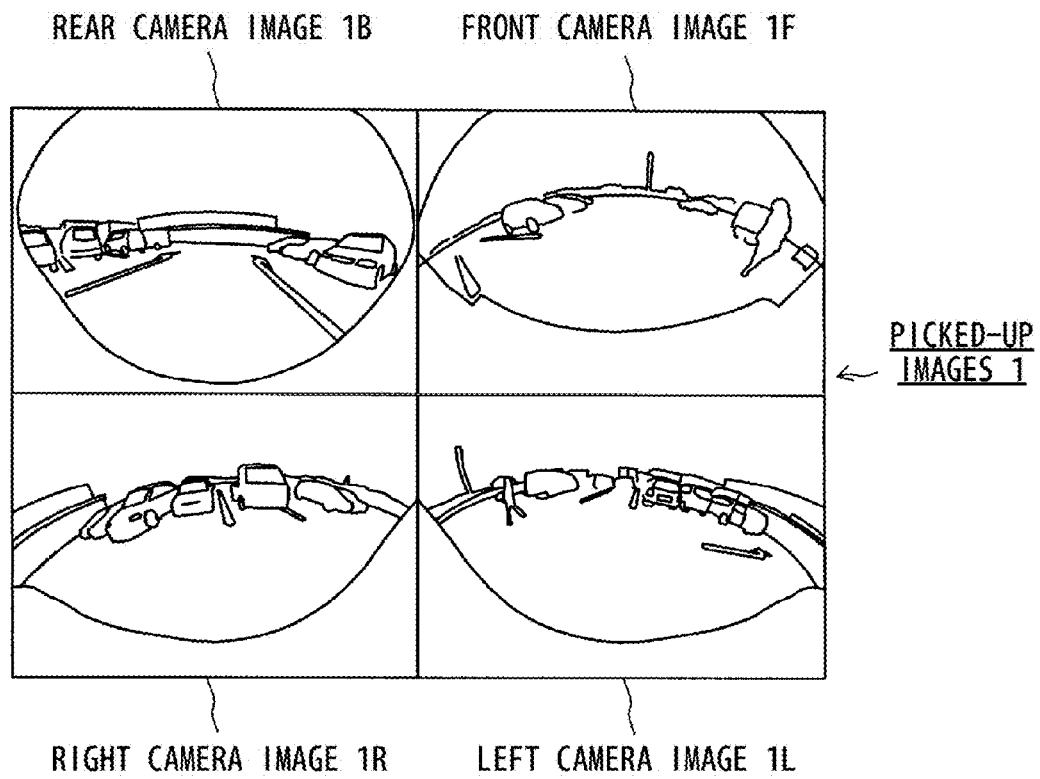
FIG. 1 illustrates an example of picked-up images obtained by in-vehicle cameras.
Figure 2:
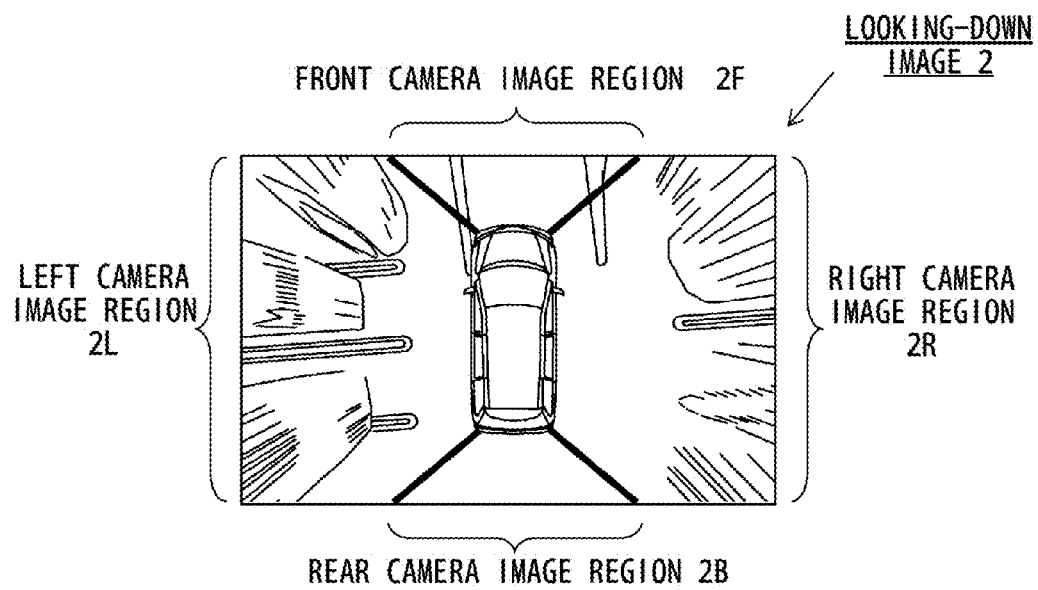
FIG. 2 illustrates an example of a looking-down image generated by synthesizing the picked-up images illustrated in FIG. 1.
Figure 4:
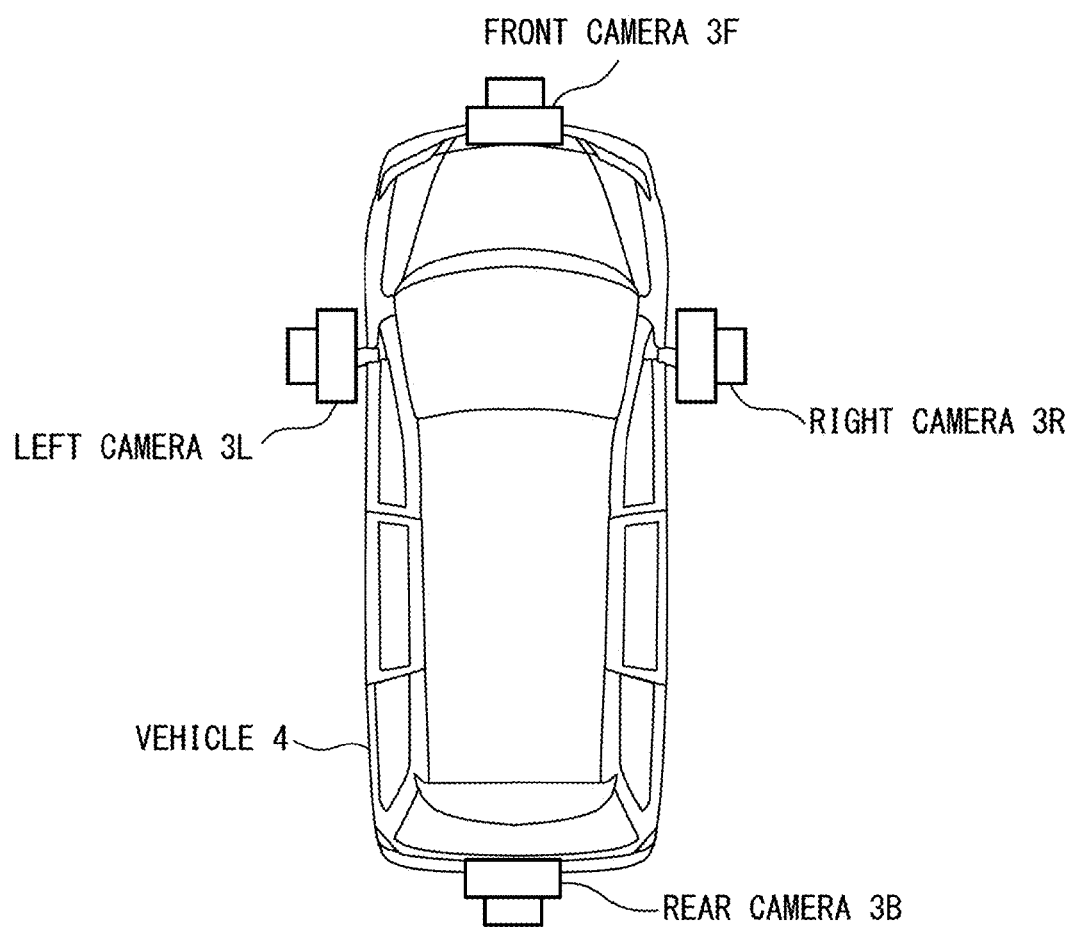
FIG. 4 explains an example of installation of in-vehicle cameras.

The four cameras, i.e., front camera 3F, rear camera 3B, left camera 3L, and right camera 3R, are installed in the front part, the rear part, the left part and the right part of a vehicle 4, respectively, as illustrated in FIG. 4. Front camera 3F, rear camera 3B, left camera 3L, and right camera 3R pick up images of the surroundings of the vehicle 4, which is an example of a target, in different directions. In other words, they pick up images in the front, rear, right and left directions. They respectively obtain the picked-up images 1 as exemplified in FIG. 1, i.e., front camera image 1F, rear camera image 1B, left camera image 1L and right camera image 1R, respectively.

In the explanations below, these four cameras are referred to as the "camera 3" or the "cameras 3" when they do not have to be distinguished from each other.

From the picked-up images 1 described above, the image processing apparatus 10 generates an image including images of the surroundings of the vehicle 4 viewed from an arbitrary viewpoint, and displays the generated image. This generated and displayed image is referred to as a "synthesized image" in the explanations below.

The image processing apparatus 10 includes an input image frame buffer 11, a brightness correction table generator 12, a brightness correction table storage 13, a projection plane data storage 14, a viewpoint position determinator 15, an image synthesizer 16, and an image display 17.

The input image frame buffer 11 is an image memory that stores the picked-up images 1 output from the respective cameras 3.

The brightness correction table generator 12 refers to the picked-up images 1 stored in the input image frame buffer 11, calculates a correction value for a pixel value of a pixel that partially constitutes the picked-up images 1 on the basis of the brightness of each of the picked-up images 1, and generates a brightness correction table, which will be explained later.

The brightness correction table storage 13 is a memory that stores a brightness correction table generated by the brightness correction table generator 12.

A brightness correction table may be generated by the brightness correction table generator 12 each time the input image frame buffer 11 is updated, i.e., for example each time a picked-up image is stored in the input image frame buffer 11 from each of the cameras 3 at the frequency of thirty frames per second. However, because the brightness differences in the picked-up images 1 between the cameras 3 do not change dramatically as a general rule, a brightness correction table may be generated by the brightness correction table generator 12 at a lower frequency, e.g., once every thirty frames, instead of the above frequency. In such a case, the brightness correction table storage 13 holds a brightness correction table that was generated last.

The projection plane data storage 14 is a memory that stores data regarding the projection plane on which the picked-up images 1 are projected in the generation process of a synthesized image.

The viewpoint position determinator 15 determines which viewpoint position to look down from so as to generate a synthesized image. This determination of a viewpoint position may be conducted by selecting a position registered in advance. Also, this determination of a viewpoint position may be dynamically calculated in accordance with operations of the steering wheel, the accelerator pedal, the gearshift lever, the brake pedal, etc. It is also possible to determine to change the viewpoint position discretely and also to determine to change the viewpoint position between different viewpoint positions continuously.

The image synthesizer 16 corrects the pixel value of a pixel that is a constituent of the picked-up images 1 so as to obtain the pixel value of the pixel corresponding to the pixel in a synthesized image, and thereby generates a synthesized image. Correction of the pixel value of a pixel that is a constituent of the picked-up images 1 is performed on the basis of the positional relationship of the pixel in the picked-up images 1, the correspondence relationship between the picked-up images 1 and the synthesized image, and a correction value stored in the brightness correction table storage 13. Operations of the image synthesizer 16 will be explained later in detail. The image synthesizer 16 performs the above generating of a synthesized image each time the input image frame buffer 11 is updated.

The image display 17 displays a synthesized image obtained by the synthesization by the image synthesizer 16 so as to provide the image to the driver etc. of the vehicle 4.

The drive assist system illustrated in FIG. 3 has the above configuration.

Next, an image synthesization process executed by the image synthesizer 16 included in the image processing apparatus 10 illustrated in FIG. 3 will be explained in more detail.

The image synthesizer 16 projects the picked-up images 1 stored in the input image frame buffer 11 on a three-dimensional projection plane that is defined in a three-dimensional space, and thereby generates a synthesized image.

FIG. 5 illustrates the shape of a three-dimensional projection plane used in the present example in an orthogonal three-dimensional space coordinate system having the X, Y and Z axes. This three-dimensional projection plane 5 is defined by polygonal approximated polygons as a plane that is close to the road surface in the vicinity of the vehicle 4 and that becomes closer to upwardly vertical, i.e., to the positive direction of the Z axis, with an increasing distance from the vehicle 4, so as to project outwardly. In the example illustrated in FIG. 5, three-dimensional projection plane 5 is defined by using quadrangular polygons.

The vertexes of each polygon defining the three-dimensional projection plane 5 are expressed by coordinate values (X, Y, Z) in the three-dimensional space. The coordinate values of the vertexes of each polygon are stored in advance in a vertex data table that is included in the projection plane data storage 14.

FIG. 6 illustrates an example of the picked-up images 1 stored in the input image frame buffer 11. The picked-up images 1 illustrated in FIG. 6 represent rectangles corresponding to respective polygons that define the three-dimensional projection plane 5. For example, the polygon with diagonal lines in the three-dimensional projection plane 5 exemplified in FIG. 5 corresponds to the polygon with diagonal lines displayed in left camera image 1L in the picked-up images 1 illustrated in FIG. 6.

In the present example, front camera image 1F, rear camera image 1B, left camera image 1L, and right camera image 1R arranged in the orthogonal two-dimensional plane coordinate system. having S and T as illustrated in FIG. 6 are stored in the input image frame buffer 11. Accordingly, a pixel that is a constituent of the picked-up images 1 is referred to by using coordinate values (S, T), which indicates the position of the pixel.

The vertex data table described above has already stored coordinates that represent pixels, of the picked-up images 1, that will be positioned at the vertexes of each polygon when the picked-up images 1 are projected onto the three-dimensional projection plane 5 by the image synthesization process. In other words, the vertex data table represents correspondence relationships between the picked-up images 1 and the synthesized image.

FIG. 7 illustrates an example of a data structure of the vertex data table.

In FIG. 7, numbers for identifying individual vertexes of polygons that define the three-dimensional projection plane 5 are stored as "vertex ID". Coordinate values of the vertexes determined by vertex IDs in the X-Y-Z space are stored as "vertex coordinates in projection plane". Also, coordinate values, in the S-T plane, of pixels of the picked-up images 1 that will be positioned at the vertexes determined by vertex IDs are stored as "coordinates of pixels in picked-up images".

Relationships, expressed by the vertex data table, of coordinate values of each vertex between the X-Y-Z space and the S-T plane are calculated in advance by using the installation positions and the viewpoint directions of the cameras 3 installed in the vehicle 4 and internal parameters of the cameras 3. A method for this calculation is known to the public, and is explained in for example Patent Document 5 cited above.

The three-dimensional projection plane 5 is defined by polygons that are constituted by combinations of the vertexes registered in the vertex data tables. Combinations of vertexes constituting respective polygons are represented in a polygon data table, which is stored in the projection plane data storage 14 together with the vertex data table.

Figure 8:
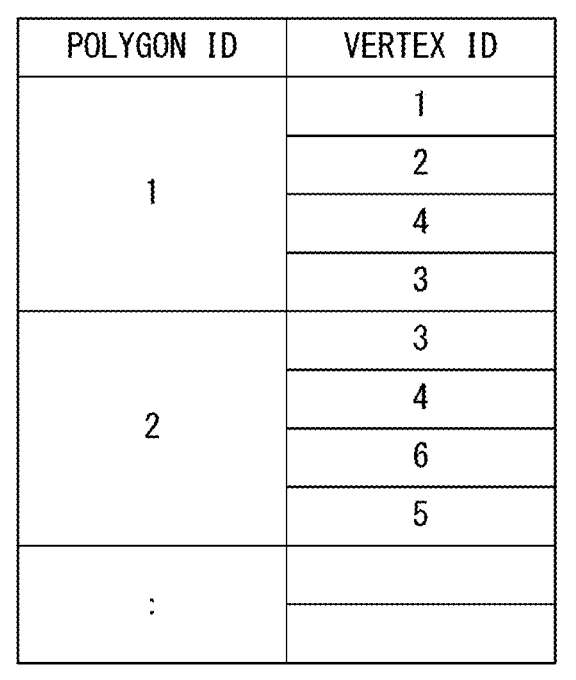

FIG. 8 illustrates an example of a data structure of a polygon data table.

In FIG. 8, numbers for identifying individual polygons that define the three-dimensional projection plane 5 are stored as "polygon ID". The numbers in the "vertex ID" column in the vertex data table are stored as "vertex ID", which is information for identifying the vertexes of polygons determined by polygon IDs.

Figure 9:
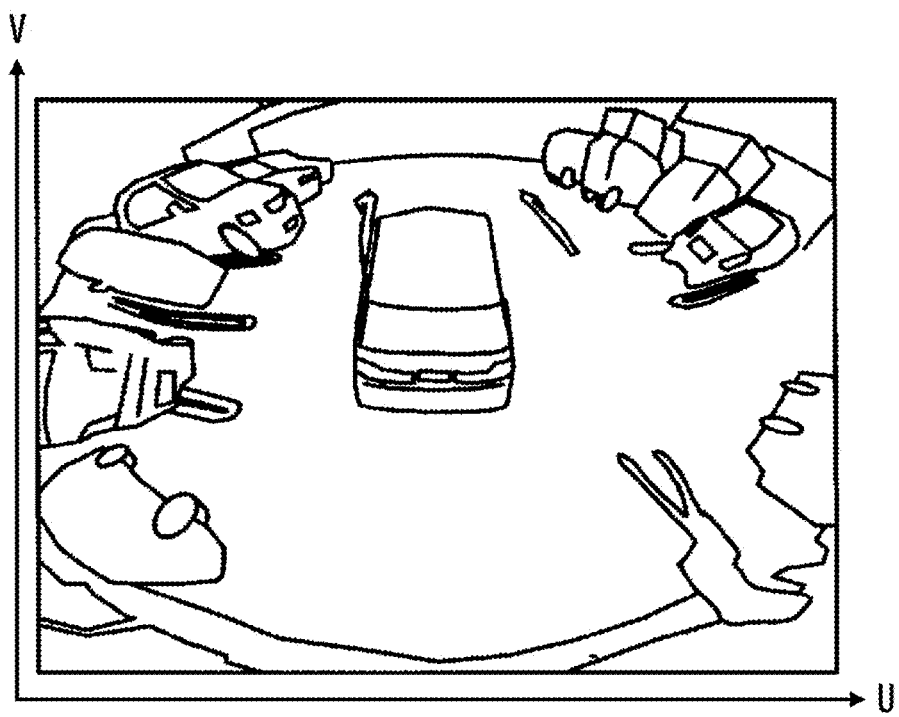
FIG. 9 illustrates an example of a synthesized image.

A synthesized image is generated by drawing respective polygons expressed in the polygon data table, i.e., respective polygons defining the three-dimensional projection plane 5 at arbitrary synthesization viewpoint positions defined in the X-Y-Z space. This drawing process is a three-dimensional graphic process that is practiced widely, and the image synthesizer 16 executes a texture polygon drawing process by using the picked-up images 1 as a texture image, coordinates (S, T) as texture coordinates, and coordinate values (X, Y, Z) as polygon vertex coordinates. By executing this drawing process, a synthesized image is obtained at a viewpoint position determined by the viewpoint position determinator 15. FIG. 9 illustrates an example of a synthesized image generated by the image synthesizer 16 in the above manner, and this synthesized image is generated on a two-dimensional plane defined by the U axis and the V axis that are orthogonal to each other.

However, the present example executes the above image synthesization process while conducting the brightness correction on the picked-up images 1. Because of this, in the present example, the brightness correction table generator 12 generates a brightness correction table.

Next, procedures for generating a brightness correction table performed by the brightness correction table generator 12 in the image processing apparatus 10 illustrated in FIG. 3 will be explained.

The brightness correction table generator 12 first calculates a correction value for a pixel value of a pixel positioned at the boundary between two of the picked-up images 1 that will be adjacent to each other in the generating of a synthesized image performed by the image synthesizer 16. More specifically, the brightness correction table generator 12 calculates, as a correction value, a value by which the brightnesses of pixels at the boundary between the two of the picked-up images 1 are corrected to a value equal to the average value between the brightnesses of those two of the picked-up images 1.

First, FIG. 10 will be explained. In FIG. 10, white quadrangular marks have been put on the pixels of some of the vertexes of the polygons in the picked-up images 1, illustrated in FIG. 6, in which polygons are displayed. The pixel at the vertexes on which the marks have been put are pixels at the boundary between two of the picked-up images 1 that will be adjacent to each other in the generating of a synthesized image performed by the image synthesizer 16. In the explanations below, these pixels are referred to as "boundary pixels". The brightness correction table generator 12 calculates, as a correction value, a value that makes the brightness values of these boundary pixels equal to each other.

In a synthesized image generated by the image synthesizer, rear camera image 1B, right camera image 1R, and left camera image 1L will be adjacent to each other. It is assumed that the average brightness value between respective boundary pixels in rear camera image 1B corresponding to respective vertexes that will be positioned at the boundary between rear camera image 1B and right camera image 1R in a synthesized image is treated as $L_{B1}$ and that the correction value for these boundary pixels is treated as $C_{B1}$. It is also assumed that the average brightness value between respective boundary pixels in right camera image 1R corresponding to those vertexes is treated as $L_{R2}$ and that the correction value for those boundary pixels is treated as $C_{R2}$.

The brightness correction table generator 12 calculates correction values $C_{B1}$ and $C_{R1}$ for a case when average brightness value $L_{BR}$ between respective boundary pixels positioned at respective vertexes in a synthesized image is the average value between two average brightness values $L_{B1}$ and $L_{R2}$ described above. In other words, the brightness correction table generator 12 calculates correction values $C_{B1}$ and $C_{R2}$ that satisfy [Expression 1] below.

$$L_{B1}C_{B1} = L_{R2}C_{R2} = L_{BR} = \frac{L_{B1} + L_{R2}}{2} \qquad \text{[Expression 1]}$$

When [Expression 1] above is solved for $C_{B1}$ and $C_{R1}$, [Expression 2] below is obtained.

$$\begin{cases} C_{B1} = \dfrac{L_{B1} + L_{R2}}{2 \times L_{B1}} \\ C_{R2} = \dfrac{L_{B1} + L_{R2}}{2 \times L_{R2}} \end{cases} \qquad \text{[Expression 2]}$$

In other words, the brightness correction table generator 12 calculates correction values $C_{B1}$ and $C_{R2}$ by performing calculation based on [Expression 2] above.

Similarly, it is assumed that the average brightness values of respective boundary pixels in right camera image 1R and front camera image 1F corresponding to respective vertexes at the boundary between right camera image 1R and front camera image 1F are treated as $L_{R2}$ and $L_{F2}$ and that the correction values for these boundary pixels are treated as $C_{R1}$ and $C_{F2}$. It is also assumed that the average brightness values of respective boundary pixels in front camera image 1F and left camera image 1L corresponding to respective vertexes at the boundary between front camera image 1F and left camera image 1L are treated as $L_{F1}$ and $L_{L2}$ and that the correction values for these boundary pixels are treated as $C_{F1}$ and $C_{L2}$. Further, it is also assumed that the average brightness values of respective boundary pixels in left camera image 1L and rear camera image 1B corresponding to respective vertexes at the boundary between left camera image 1L and rear camera image 1B are treated as $L_{L1}$ and $L_{B2}$ and that the correction values for these boundary pixels are treated as $C_{L1}$ and $C_{B2}$. In this situation, the brightness correction table generator 12 performs calculation based on [Expression 3], [Expression 4] and [Expression 5] below so as to calculate correction values $C_{R1}$, $C_{F2}$, $C_{F1}$, $C_{L2}$, $C_{L1}$ and $C_{B2}$ for boundary pixels that will be positioned at boundaries between the picked-up images 1 when the synthesized images are generated.

$$\begin{cases} C_{R1} = \dfrac{L_{R1} + L_{F2}}{2 \times L_{R1}} \\ C_{F2} = \dfrac{L_{R1} + L_{F2}}{2 \times L_{F2}} \end{cases} \qquad \text{[Expression 3]}$$

$$\begin{cases} C_{F1} = \dfrac{L_{F1} + L_{L2}}{2 \times L_{F1}} \\ C_{L2} = \dfrac{L_{F1} + L_{L2}}{2 \times L_{L2}} \end{cases} \qquad \text{[Expression 4]}$$

$$\begin{cases} C_{L1} = \dfrac{L_{L1} + L_{B2}}{2 \times L_{L1}} \\ C_{B2} = \dfrac{L_{L1} + L_{B2}}{2 \times L_{B2}} \end{cases} \qquad \text{[Expression 5]}$$

Next, the brightness correction table generator 12 calculates a correction value for respective pixels in the picked-up images 1 that will be positioned at the respective vertexes of polygons defining the three-dimensional projection plane 5 on which the synthesized image is projected. In accordance with the positional relationships of the respective pixels with respect to the boundary pixels in the X-Y-Z space, the brightness correction table generator 12 calculates this correction value by performing linear interpolation on correction values $C_{R1}$, $C_{F2}$, $C_{F1}$, $C_{L2}$, $C_{L1}$ and $C_{B2}$ calculated in the above manner. This linear interpolation will be explained by using FIG. 11.

Figure 11:
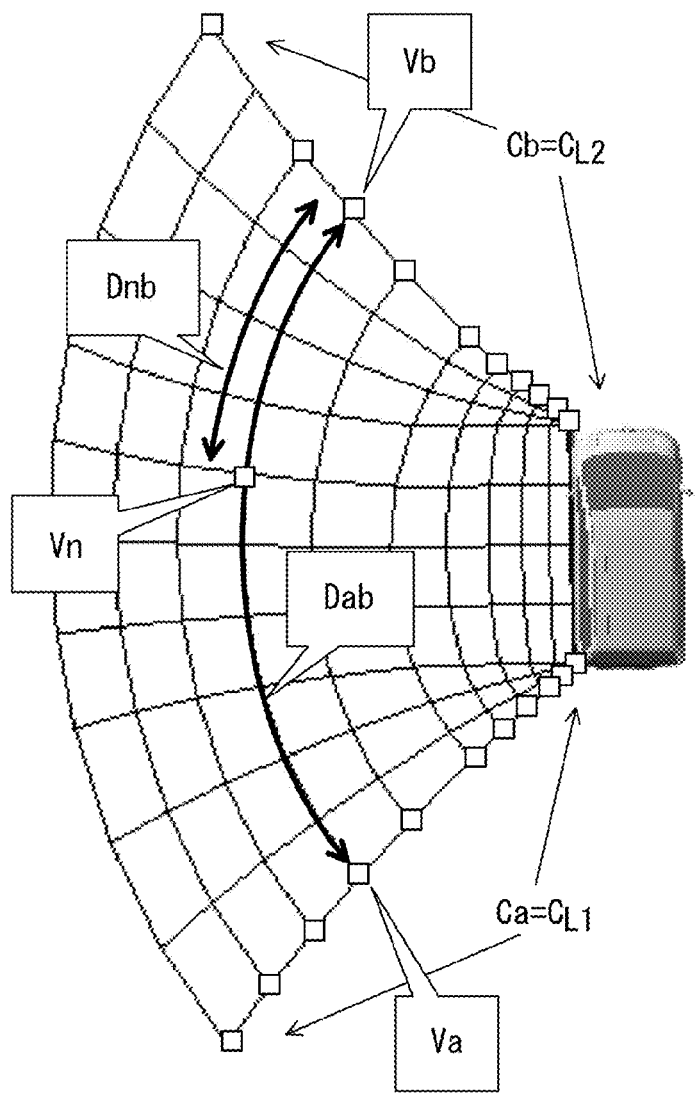
FIG. 11 illustrates procedures of the generating of the brightness correction table (second)

In FIG. 11, correction value Cn is calculated for the pixel in left camera image 1L that will be positioned at vertex Vn of a polygon.

In FIG. 11, vertex Va is the vertex from which a route reaches vertex Vn through the smallest number of sides of polygons among vertexes at the boundary between left camera image 1L and rear camera image 1B. Vertex Vb is the vertex from which a route reaches vertex Vn through the smallest number of sides of polygons among vertexes at the boundary between left camera image 1L and front camera image 1F. It is assumed that the correction values for the boundary pixels respectively corresponding to vertex Va and vertex Vb in left camera image 1L are Ca and Cb. It is also assumed that these correction values Ca and Cb have already been calculated by the brightness correction table generator 12 on the basis of [Expression 5] and [Expression 4] described above.

In such a case, brightness correction table generator 12 performs calculation based on [Expression 6] below so as to perform linear interpolation on correction values Ca and Cb, and thereby calculates correction value Cn.

$$Cn = \frac{D_{nb}}{D_{ab}}Ca + \frac{D_{ab} - D_{nb}}{D_{ab}}Cb \qquad \text{[Expression 6]}$$

In [Expression 6], $D_{ab}$ represents the shortest route length that reaches vertex Vb from vertex Va through the sides of polygons, and $D_{nb}$ represents the shortest route length that reaches vertex Vb from vertex Vn through the sides of polygons. By performing calculation based on [Expression 6], brightness correction values are obtained for respective vertexes that have been interpolated smoothly in accordance with the route lengths in the circumferential direction of the three-dimensional projection plane 5.

In the above manner, for each of the picked-up images 1, the brightness correction table generator 12 calculates correction values for respective pixels in the picked-up images 1 that will be positioned at respective vertexes of the polygons defining the three-dimensional projection plane 5. The brightness correction table generator 12 associates the vertex ID for identifying a pixel in the picked-up images 1 with the correction value calculated for that pixel, and thereby generates a brightness correction table.

FIG. 12 illustrates an example of a data structure of a brightness correction table. As illustrated in FIG. 12, in the brightness correction table, "vertex ID" and "correction value" are associated.

Figure 13:
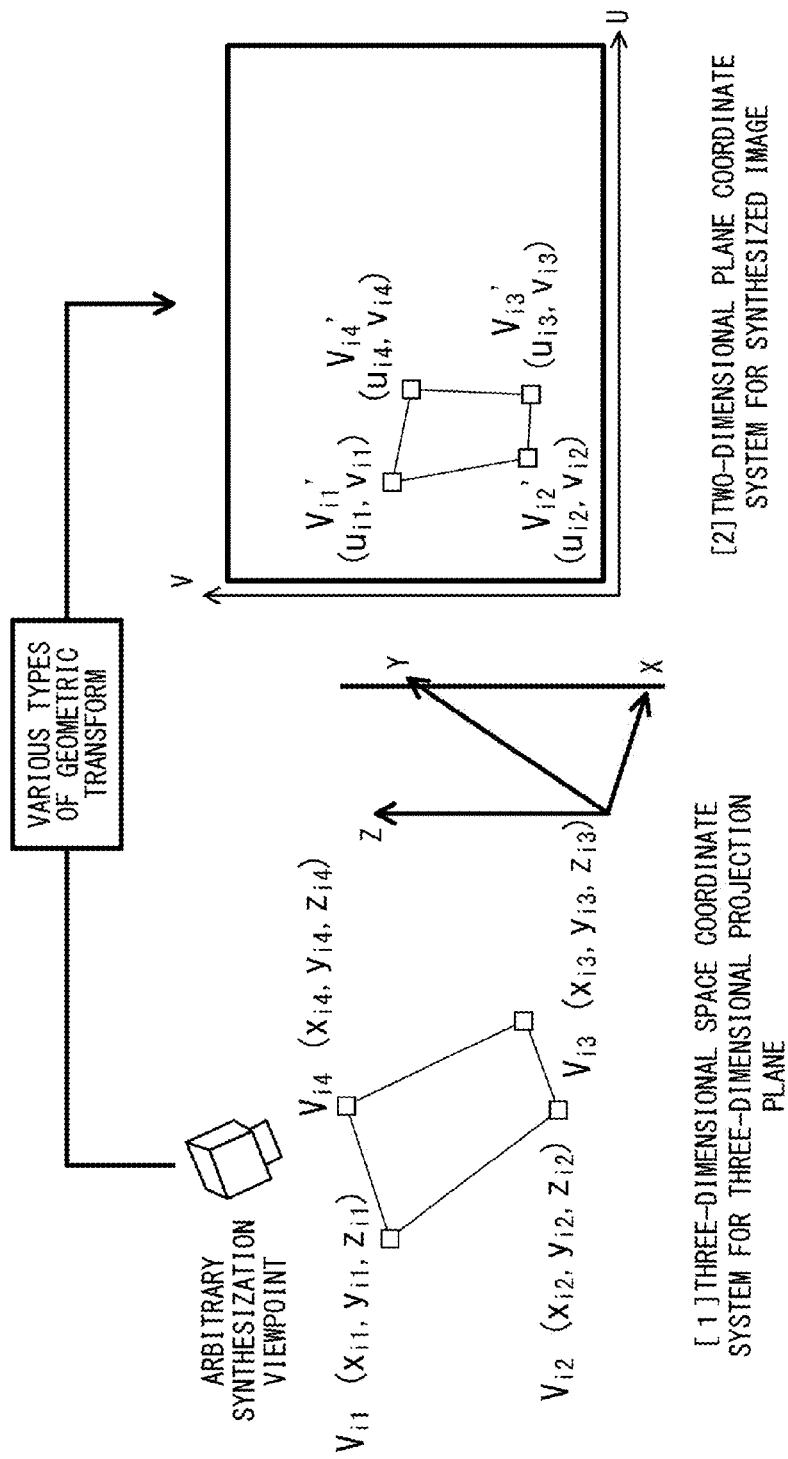
FIG. 13 explains an image synthesization process including brightness correction on picked-up images (first)

Next, by referring to FIG. 13, explanations will be given for an image synthesization process, including brightness correction on the picked-up images 1, that is performed by the image synthesizer 16 by using a brightness correction table generated in the above manner.

First, the image synthesizer 16 executes a process of sequentially drawing all polygons in the polygon data table by executing a known three-dimensional computer graphic process based on a viewpoint position determined by the viewpoint position determinator so as to generate a synthesized image.

In this process of drawing, it is assumed that the ID of the i-th polygon to be drawn is Pi and that the vertex IDs of the four vertexes constituting this polygon Pi are $V_{i1}$, $V_{i2}$, $V_{i3}$ and $V_{i4}$. The three-dimensional coordinates of these four vertexes in the X-Y-Z space coordinate system are expressed in the vertex data table. The image synthesizer 16 performs various types of geometric transform such as viewing transformation, modeling transformation, projection transformation, etc., and thereby these four vertexes defined in the X-Y-Z space coordinate system are converted into four points in the U-V plane coordinate system. The four points after conversion are assumed to be $V_{i1}'$, $V_{i2}'$, $V_{i3}'$ and $V_{i4}'$.

It is assumed that the three-dimensional coordinates of vertexes $V_{i1}$, $V_{i2}$, $V_{i3}$, and $V_{i4}$ in the X-Y-Z space coordinate system are $(x_{ij}, y_{ij}, z_{ij})$ (j=1, 2, 3, 4). It is also assumed that the coordinates of points $V_{i1}'$, $V_{i2}'$, $V_{i3}'$ and $V_{i4}'$ in the U-V plane coordinate system after the conversion of these four vertexes are $(u_{ij}, v_{ij})$ (j=1, 2, 3, 4). FIG. 13 schematically illustrates this conversion.

Regarding two pairs which each consist of two opposite sides in a quadrangular polygon constituted by four vertexes expressed in the U-V plane coordinate system, attention is focused on the intersection point between a straight line that internally divides the two sides of one of the two pairs at the first ratio and another straight line that internally divides the two sides of the other of the two pairs at the second ratio. In other words, attention is focused on intersection point V between a straight line internally dividing the side between $V_{i1}'$ and $V_{i4}'$ and the side between $V_{i2}'$ and $V_{i3}'$ at the ratio of a:(1−a) and another straight line internally dividing the opposite sides between $V_{i2}'$ and $V_{i1}'$ and between $V_{i3}'$ and $V_{i4}'$ at the ratio of b:(1−b) in the quadrangle drawn in FIG. 14. The coordinates $(u_{ik}, v_{ik})$ of this intersection point V are expressed by [Expression 7] below.

$$\begin{pmatrix} u_{ik} \\ v_{ik} \end{pmatrix} = b\left\{(1-a)\begin{pmatrix} u_{i1} \\ v_{i1} \end{pmatrix} + a\begin{pmatrix} u_{i4} \\ v_{i4} \end{pmatrix}\right\} + \qquad \text{[Expression 7]}$$
$$(1-b)\left\{(1-a)\begin{pmatrix} u_{i2} \\ v_{i2} \end{pmatrix} + a\begin{pmatrix} u_{i3} \\ v_{i3} \end{pmatrix}\right\}$$

Meanwhile, the coordinates $(s_{ik}, t_{ik})$ of the point in the picked-up images 1 in the S-T plane coordinate system that corresponds to intersection point V in the U-V plane coordinate system is expressed by [Expression 8] below.

$$\begin{pmatrix} s_{ik} \\ t_{ik} \end{pmatrix} = b\left\{(1-a)\begin{pmatrix} s_{i1} \\ t_{i1} \end{pmatrix} + a\begin{pmatrix} s_{i4} \\ t_{i4} \end{pmatrix}\right\} + \qquad \text{[Expression 8]}$$
$$(1-b)\left\{(1-a)\begin{pmatrix} s_{i2} \\ t_{i2} \end{pmatrix} + a\begin{pmatrix} s_{i3} \\ t_{i3} \end{pmatrix}\right\}$$

Note that $(s_{ij}, t_{ij})$ (j=1, 2, 3, 4) represents coordinates of points, in the picked-up images 1, that correspond to the four vertexes constituting polygon Pi. These coordinate values are associated with four vertex IDs of the four vertexes, i.e., $V_{i1}$, $V_{i2}$, $V_{i3}$ and $V_{i4}$, and are stored in the vertex data table.

Also, the image synthesizer 16 calculates correction value $C_{ik}$ for the pixel that will be positioned at intersection point V by calculation based on [Expression 9] below.

$$C_{ik} = b\{(1-a)C_{i1} + aC_{i4}\} + (1-b)\{(1-a)C_{i2} + aC_{i3}\} \qquad \text{[Expression 9]}$$

$C_{ij}$ (j=1, 2, 3, 4) in [Expression 9] are correction values for four vertexes $V_{i1}'$, $V_{i2}'$, $V_{i2}'$ and $V_{i4}'$ described above.

These correction values are stored for the vertex IDs of the four vertexes, i.e., $V_{i1}$, $V_{i2}$, $V_{i3}$ and $V_{i4}$ in the brightness correction table. The image synthesizer 16 performs calculation based on [Expression 9] so as to calculate a weighting average value for the correction values of the four vertexes, in accordance with distances between intersection point V and the four vertexes, as a correction value used for correcting a pixel that will be positioned at intersection point V.

The image synthesizer 16 performs calculation based on [Expression 10] below so as to obtain pixel value $G(u_{ik}, v_{ik})$ of the pixel positioned at above-described point $V(u_{ik}, v_{ik})$ in the U-V plane coordinate system.

$$G(u_{ik}, v_{ik}) = \text{Clip}(C_{ik} \times P(s_{ik}, t_{ik})) \qquad \text{[Expression 10]}$$

$P(s_{ik}, t_{ik})$ in [Expression 10] is the pixel value of a pixel in the picked-up images 1 positioned at coordinates $(s_{ik}, t_{ik})$ for the above-described point in the S-T plane coordinate system. Also, function Clip( ) is a function that rounds a parameter pixel value to a prescribed number of bits. When for example both $G(u_{ik}, v_{ik})$ and $P(s_{ik}, t_{ik})$ are expressed by values each having eight bits for each of light's three primary colors, i.e., red, green and blue, function Clip( ) performs a process of rounding a parameter pixel value to a value having eight bits for each of red, green and blue.

The image synthesizer 16 obtains the values of a and b in a case when [Expression 7] is satisfied for point $V(u_{ik}, v_{ik})$, and substitutes the obtained values into [Expression 8] and [Expression 9] so as to perform the calculation. Then, calculation based on [Expression 10] is performed for the obtained coordinates $(s_{ik}, t_{ik})$ and correction value $C_{ik}$ so as to obtain pixel value $G(u_{ik}, v_{ik})$ of the pixel positioned at point $V(u_{ik}, v_{ik})$, and thereby generates a synthesized image.

While quadrangular polygons define the three-dimensional projection plane 5 in the above example, it is also possible to employ a configuration in which other polygons define the three-dimensional projection plane 5. When for example triangular polygons define the three-dimensional projection plane 5, the image synthesizer 16 generates a synthesized image in the following manner.

It is first assumed that the polygon ID of the i-th polygon to be drawn is Pi, that the vertex IDs of the three vertexes constituting this polygon Pi are $V_{i1}$, $V_{i2}$ and $V_{i3}$, and that their three-dimensional coordinates in the X-Y-Z space coordinate system are $(x_{ij}, y_{ij}, z_{ij})$ (j=1, 2, 3). The three-dimensional coordinates of these three vertexes in the X-Y-Z space coordinate system are expressed in the vertex data table. It is also assumed that the three points in the U-V plane coordinate system after the image synthesizer 16 performed various types of geometric transform are $V_{i1}'$, $V_{i2}'$ and $V_{i3}'$ and that their coordinates are $(u_{ij}, v_{ij})$ (j=1, 2, 3).

In a situation where there is a triangular polygon formed by three vertexes expressed in the U-V plane coordinate system, attention is focused on a point that internally divides one of the three sides forming the triangular polygon at the first ratio and on a point that internally divides the segment connecting the vertexes that do not exist on the above side at the second ratio. In other words, regarding the triangle drawn in FIG. 15, attention is focused on point V that internally divides, at the ratio of b:(1−b), the segment connecting vertex $V_{i2}'$ and the point internally dividing the side between $V_{i1}'$ and $V_{i3}'$ at the ratio of a:(1−a). The coordinates $(u_{ik}, v_{ik})$ of this point V are expressed by the [Expression 11] below.

$$\begin{pmatrix} u_{ik} \\ v_{ik} \end{pmatrix} = b\left\{(1-a)\begin{pmatrix} u_{i1} \\ v_{i1} \end{pmatrix} + a\begin{pmatrix} u_{i3} \\ v_{i3} \end{pmatrix}\right\} + (1-b)\begin{pmatrix} u_{i2} \\ v_{i2} \end{pmatrix} \quad \text{[Expression 11]}$$

Meanwhile, the coordinates $(s_{ik}, t_{ik})$ of the point in the picked-up images 1 in the S-T plane coordinate system corresponding to this point V in the U-V plane coordinate system are expressed by [Expression 12] below.

$$\begin{pmatrix} s_{ik} \\ t_{ik} \end{pmatrix} = b\left\{(1-a)\begin{pmatrix} s_{i1} \\ t_{i1} \end{pmatrix} + a\begin{pmatrix} s_{i3} \\ t_{i3} \end{pmatrix}\right\} + (1-b)\begin{pmatrix} s_{i2} \\ t_{i2} \end{pmatrix} \quad \text{[Expression 12]}$$

In [Expression 12], $(s_{ij}, t_{ij})$ (j=1, 2, 3) are the coordinates, in the S-T plane coordinate system, of the points in the picked-up images 1 that correspond to the three vertexes forming polygon Pi. These coordinate values are associated with the three vertex IDs of the three vertexes, i.e., $V_{i1}$, $V_{i2}$, and $V_{i3}$, and are stored in the vertex data table.

Also, the image synthesizer 16 calculates correction value $C_{ik}$ for the pixel that will be positioned at point V by performing calculation based on [Expression 13] below.

$$C_{ik} = b\{(1-a)C_{i1} + aC_{i3}\} + (1-b)C_{i2} \quad \text{[Expression 13]}$$

$C_{ij}$ (j=1, 2, 3) in [Expression 13] are correction values for three vertexes $V_{i1}'$, $V_{i2}'$ and $V_{i3}'$ described above, and the values that are stored in the brightness correction table as the vertex IDs of the three vertexes, i.e., $V_{i1}$, $V_{i2}$ and $V_{i3}$. The image synthesizer 16 performs calculation based on [Expression 13] so as to calculate a weighting average value for the correction values of the three vertexes, in accordance with distances between point V and the three vertexes, as a correction value used for correcting a pixel that will be positioned at intersection point V.

The image synthesizer 16 obtains the values of a and b in a case when [Expression 11] is satisfied for point $V(u_{ik}, v_{ik})$, and substitutes the obtained values into [Expression 12] and [Expression 13] so as to perform the calculation. Then, calculation based on [Expression 10] is performed for the obtained coordinates $(s_{ik}, t_{ik})$ and correction value $C_{ik}$ so as to obtain pixel value $G(u_{ik}, v_{ik})$ of the pixel positioned at point $V(u_{ik}, v_{ik})$. Thereby it is possible to obtain a synthesized image even when the three-dimensional projection plane 5 is defined by a triangular polygon.

Incidentally, the image processing apparatus 10, illustrated in FIG. 3 and explained hereinbefore, may be configured by using a standard computer.

Figure 16:
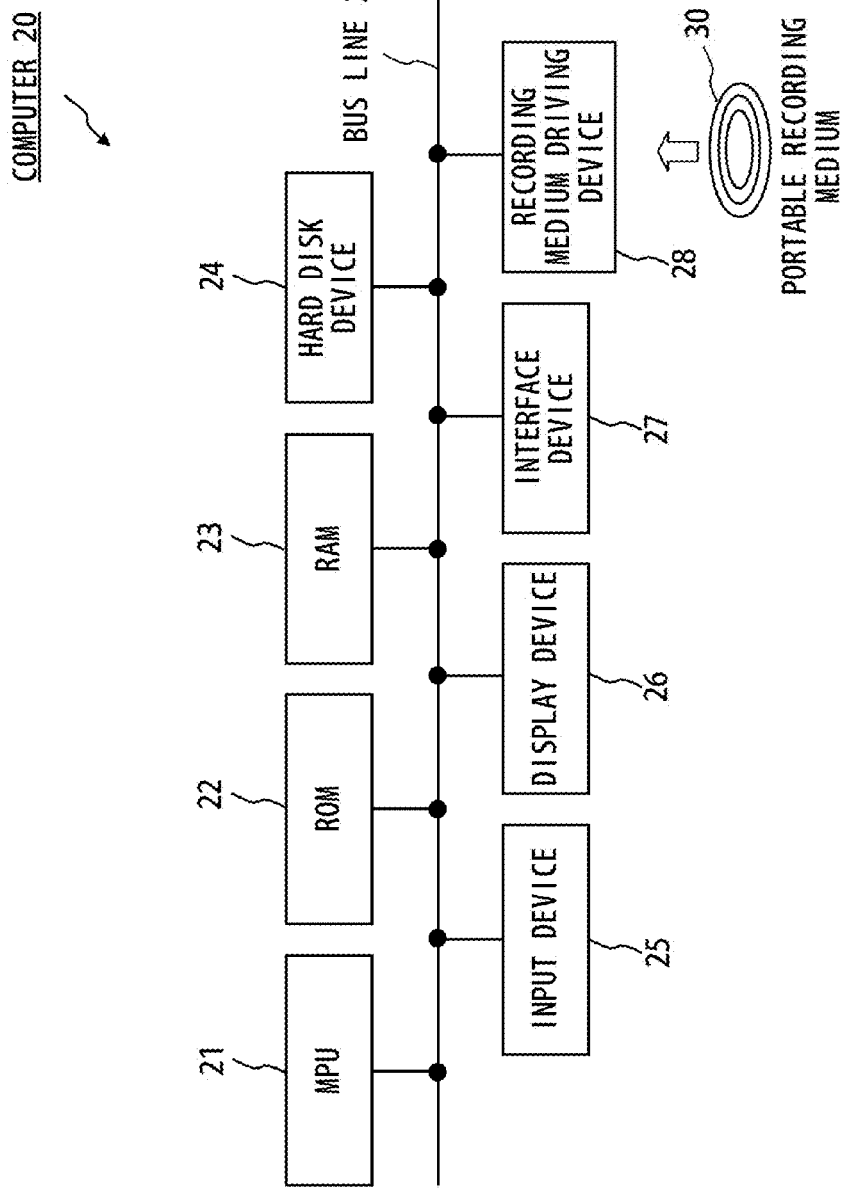
FIG. 16 illustrates an example of a hardware configuration of a computer.

Explanations will be given for FIG. 16. FIG. 16 illustrates an example of a hardware configuration of a computer 20 that operates as the image processing apparatus 10.

This computer 20 includes an MPU 21, a ROM 22, a RAM 23, a hard disk device 24, an input device 25, a display device 26, an interface device 27, and a recording medium driving device 28. These constituents are connected via a bus line 29, and can exchange various types of data with each other under control of the MPU 21.

The MPU (Micro Processing Unit) 21 is an arithmetic processing device that controls the entirety of the operation of the computer 20.

The ROM (Read Only Memory) 22 is a read-only semiconductor memory that has recorded in advance a prescribed basic control program. The MPU 21 reads and executes this basic control program at the activation of a computer 20 and thereby the operation control of the respective constituents of the computer 20 is made possible. Also, a non-volatile memory, which does not lose stored data even when a power supply has halted, such as a flash memory, etc., may be used as the ROM 22.

The RAM (Random Access Memory) 23 is a semiconductor memory that can be written and read arbitrarily and that is used as a working memory area on an as-needed basis when the MPU 21 executes various types of control programs. RAM 23 functions as the input image frame buffer 11 and the brightness correction table storage 13.

The hard disk device 24 is a storage device that stores various types of control programs executed by the MPU 21 and various types of data. The MPU 21 reads and executes a prescribed control program stored in the hard disk device 24 so as to make it possible to perform a control program, which will be explained later. The hard disk device 24 functions also as the projection plane data storage 14. It is also possible to employ a configuration in which an MPU 51 reads the vertex data table and the polygon data table from the hard disk device 24 at the start of the execution of the control process, which will be explained later, and stores the read tables in the RAM. 23 so as to make the RAM. 23 function as the projection plane data storage 14.

The input device 25 is for example a keyboard device or a mouse device, and when manipulated by a user of the computer 20, the input device 25 obtains inputs of various pieces of information from the user that are associated with the manipulations, and transmits the obtained input information to the MPU 21.

The display device 26 is for example a liquid crystal display, and displays various texts or images in accordance with display data transmitted from the MPU 21. The display device 26 functions as the image display 17.

The interface device 27 manages the exchanges of various types of data between respective types of devices connected to the computer 20. The interface device 27 is connected to for example a camera 3, and receives the picked-up images 1 transmitted from the camera 3.

The recording medium driving device 28 is a device that reads various types of control program and data recorded in a portable recording medium 30. It is also possible for the MPU 21 to read a prescribed control program recorded in the portable recording medium 30 and execute the read program via the recording medium driving device 28 so as to perform various types of control processes, which will be explained later. Note that examples of the portable recording medium 30 include a Compact Disc Read Only Memory (CD-ROM), a Digital Versatile Disc Read Only Memory (DVD-ROM), a flash memory with a USB (Universal Serial Bus) compatible connector, etc.

In order to make the above computer 20 operate as the image processing apparatus 10, a control program is first generate a control program that makes the MPU 21 execute respective process steps of the control process, which will be explained later. The generated control program is stored in advance in the hard disk device 24 or the portable recording medium 30. Then, a prescribed instruction is given to the MPU 21 so as to make the MPU 21 read and execute this control program. Thereby, the MPU 21 functions as the respective units included in the image processing apparatus 10 illustrated in FIG. 3, and it is made possible to make the computer 20 function as the image processing apparatus 10.

Figure 17:
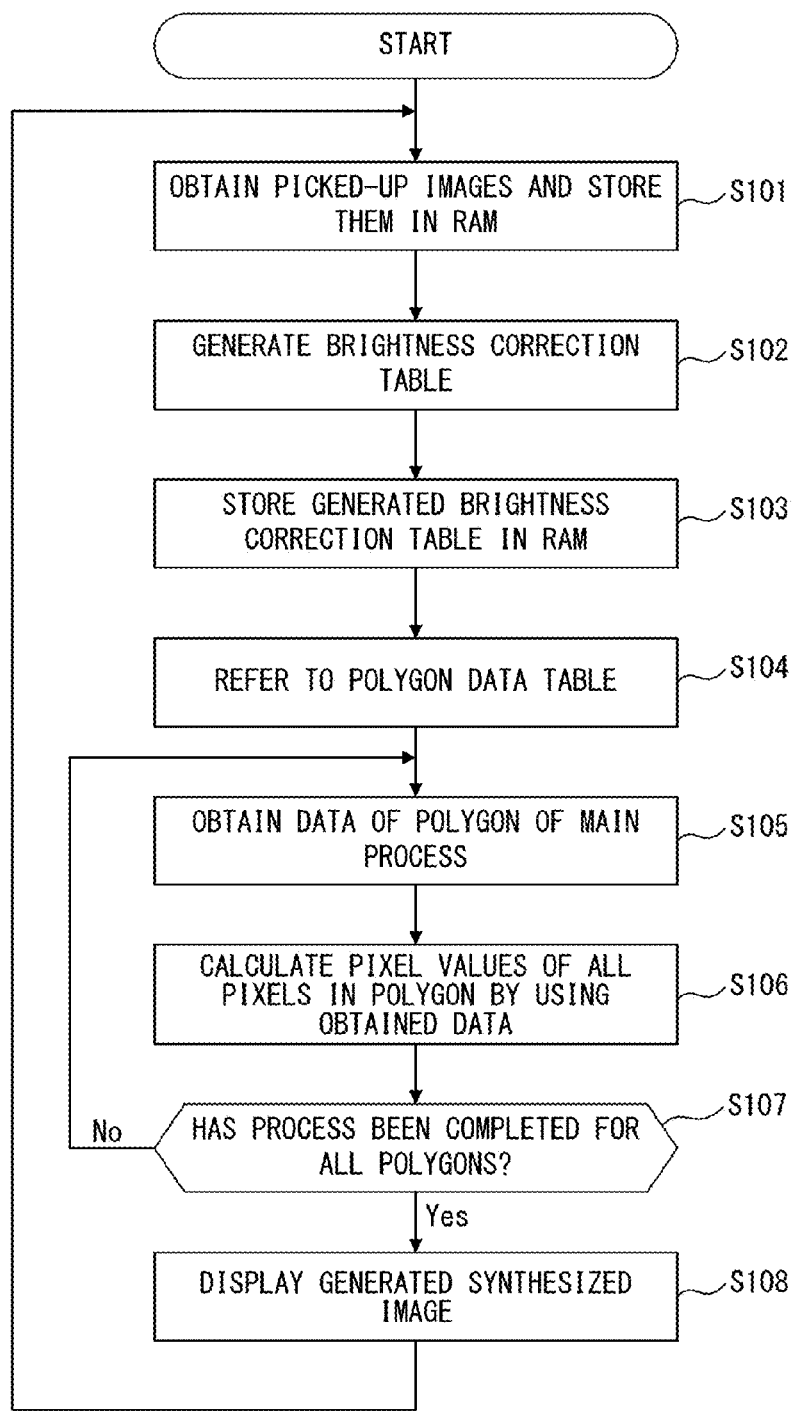
FIG. 17 is a flowchart explaining the contents of a control process executed in a computer.

Next, by referring to FIG. 17, explanations will be given for a control process that makes the computer 20 operate as the image processing apparatus 10. FIG. 17 is a flowchart that explains the process contents of this control process.

When the process illustrated in FIG. 17 has been started, the MPU 21 controls, first in S101, the interface device 27 so as to make it obtain the picked-up images 1 transmitted from a camera and the MPU 21 performs the process of storing the obtained picked-up images in the RAM 23. In this process, the RAM 23 bears the function of the input image frame buffer 11 illustrated in FIG. 3.

Next, in S102, the MPU 21 performs the process of generating a brightness correction table. In this process, the MPU 21 performs a process of calculating, as a correction value, a value by which the brightnesses of pixels at the boundary between two of the picked-up images 1 that will be adjacent to each other in the generating of a synthesized image are corrected into a value equal to the average value between the brightnesses of those two of the picked-up images 1. In other words, this process is a process in which the MPU 21 provides the above respective functions included in the brightness correction table generator 12.

Next, in S103, the MPU 21 performs a process of storing in the RAM 23 the brightness correction table generated in the process in S102. In this process, the RAM 23 bears the function of the brightness correction table storage 13 in FIG. 3.

The processes from S104 through S107, which will be explained next, are processes in which the MPU 21 provides the above respective functions included in the image synthesizer 16.

First in S104, the MPU 21 performs the process of referring to either the polygon data table or the vertex data table stored in the hard disk device 24 or the RAM 23, which is functioning as the projection plane data storage 14.

Next, in S105, the MPU 21 performs a process of obtaining data regarding a polygon that has not received an image synthesization process. In this process, the data of vertex IDs of the vertexes forming the corresponding polygon are obtained from the polygon data table and the coordinate data associated with those vertex IDs are obtained from the vertex data table.

Next, in S106, the MPU 21 performs a process of calculating pixel values of all pixels that are positioned in a polygon by using the data obtained for that polygon in the process in S105. This process is a process in which the pixel values of the pixels positioned at all points in the polygon are calculated by performing calculation based on [Expression 7], [Expression 8], [Expression 9] and [Expression 10] that are described above.

Next, the MPU 21 performs a process of determining whether or not the above process in S106 has been completed for all polygons that are registered in the polygon data table. When it has been determined that the process has been completed for all the polygons (when the determination result is Yes), the MPU 21 makes the process proceed to S108. When it has been determined that there are polygons that have not received the process (when the determination result is No), the MPU 21 makes the process return to S105, and performs the processes in S105 and S106 on those unprocessed polygons.

In S108, the MPU 21 performs a process of making the display device 26 display a synthesized image that has been generated in response to the fact that the process in S106 have been completed for all polygons registered in the polygon data table. The display device 26 that displays a synthesized image in this process bears the function of the image display 17. Thereafter, the MPU 21 makes the process return to S101, and performs the process described above on the picked-up images 1 in the next frame transmitted from the cameras 3.

By performing the above control process, the computer 20 operates as the image processing apparatus 10.

As described above, because the image processing apparatus 10 illustrated in FIG. 3 does not generate a brightness-corrected image of picked-up images and accordingly does not have a frame memory for storing corrected images, and the processing loads for generating such brightness-corrected images are saved. In a case where for example four in-vehicle cameras based on a NTSC (National Television System Committee) scheme are used and picked-up images are obtained each of which consists of 720×480 pixels each having 24 bits for red, green and blue, memory of 4 MB and 1.38 million times of pixel brightness correction processes per frame are saved.

Also, because the image processing apparatus 10 illustrated in FIG. 3 does not generate synthesized images before brightness correction either, the image processing apparatus 10 does not have a frame memory for this generating, and processing loads for the generating is saved. In a case where for example four in-vehicle cameras based on a NTSC scheme are used and picked-up images are obtained each of which consists of 720×480 pixels each having 24 bits for red, green and blue, memory of 1 MB is saved.

Also, because the image processing apparatus 10 illustrated in FIG. 3 generates correction values for vertexes on the three-dimensional projection plane 5 defined in a three-dimensional space, it is not necessary to perform recalculation of the brightness correction table even when viewpoints have moved.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An image processing apparatus that generates a synthesized image of a subject viewed from an arbitrary viewpoint from a plurality of picked-up images obtained by picking up images of surroundings of the subject in different directions, the image processing apparatus comprising
   a computer which includes a processor that performs a process including:
      a calculation process that calculates a correction value for a pixel value of a pixel that partially constitutes the picked-up images on the basis of a brightness of each of the plurality of picked-up images;
      a storage process that stores to a storage of the computer the correction value calculated by the calculation process for each of the pixels; and
      a synthesization process that corrects a pixel value of the pixel that partially constitutes the picked-up images on the basis of a positional relationship of the pixel in the picked-up images, a correspondence relationship between the picked-up images and the synthesized image, and the correction value stored in the storage to obtain a pixel value of a pixel in the synthesized image that corresponds to the pixel that partially constitutes the picked-up images, and thereby generates the synthesized image.

2. The image processing apparatus according to claim 1, wherein
   the calculation process calculates a correction value for a pixel value of a pixel positioned at a boundary between two picked-up images that will be adjacent when the synthesization process generates the synthesized image.

3. The image processing apparatus according to claim 2, wherein
   the calculation process calculates, as the correction value, a value by which brightness of the pixel positioned at the boundary between the two picked-up images is changed to an average value between brightnesses of the two picked-up images.

4. The image processing apparatus according to claim 2, wherein
   the synthesized image is an image projected on a three-dimensional projection plane that is polygonal approximated by a plurality of polygons defined in a three-dimensional space, and
   the calculation process further performs calculation of the correction value for a pixel in the picked-up images that will be positioned at a vertex of the polygon when the synthesized image is generated, by performing liner interpolation of the correction value for the pixel positioned at the boundary based on a positional relationship of the pixel with the pixel positioned at the boundary in the three-dimensional space.

5. The image processing apparatus according to claim 4, wherein
   the polygon is quadrangular,
   the image processing apparatus further includes a vertex data table in which coordinate values of four vertexes of the polygon in the three-dimensional space and coordinate values in the picked-up images of four points, in the picked-up images, that correspond to the four vertexes are stored in an associated manner, and
   the synthesization process corrects a pixel value of a pixel positioned at an intersection point between a straight line that internally divides two sides of one of two pairs of opposite sides at a first ratio in a quadrangle including as vertexes the four corresponding points in the picked-up images and a straight line that internally divides two sides of the other of the two pairs at a second ratio by using a weighting average value in accordance with distances between the intersection point and the corresponding points for the correction value of each of the four corresponding points stored in the storage so as to obtain a pixel value of a pixel that will be positioned at an intersection point between a straight line that internally divides two sides of one of two pairs of opposite sides in the polygon at the first ratio and a straight line that internally divides two sides of the other of the two pairs at the second ratio, and thereby generates the synthesized image.

6. An image processing method by which a synthesized image of a subject viewed from an arbitrary viewpoint is generated from a plurality of picked-up images obtained by picking up images of surroundings of the subject in different directions, the image processing method comprising:
   a processor, which included in a computer, that
      calculates a correction value for a pixel value of a pixel that partially constitutes the picked-up images on the basis of a brightness of each of the plurality of picked-up images and storing the correction value in a storage of the computer for each of the pixels; and
      corrects a pixel value of the pixel that partially constitutes the picked-up images on the basis of a positional relationship of the pixel in the picked-up images, a correspondence relationship between the picked-up images and the synthesized image and the correction value stored in the storage, obtaining a pixel value of a pixel in the synthesized image that corresponds to the pixel that partially constitutes the picked-up images, and thereby generates the synthesized image.

7. The image processing method according to claim 6, wherein
   in calculation of the correction value, a correction value is calculated for a pixel value of a pixel positioned at a boundary between two picked-up images that will be adjacent when the synthesized image is generated.

8. The image processing method according to claim 7, wherein
   in calculation of the correction value, a value is calculated, as the correction value, by which brightnesses the pixels positioned at the boundary between the two picked-up images are changed to an average value between brightnesses of the two picked-up images.

9. The image processing method according to claim 7, wherein the synthesized image is an image projected on a three-dimensional projection plane that is polygonal approximated by a plurality of polygons defined in a three-dimensional space, and in calculation of the correction value, calculation of the correction value is further performed for a pixel in the picked-up images that will be positioned at a vertex of the polygon when the synthesized image is generated, by performing liner interpolation of the correction value for the pixel positioned at the boundary based on a positional relationship of the pixel with the pixel positioned at the boundary in the three-dimensional space.

10. The image processing method according to claim 9, wherein the polygon is quadrangular, a correspondence relationship is obtained in advance between coordinate values of four vertexes of the polygon in the three-dimensional space and coordinate values in the picked-up images of four points, in the picked-up images, that correspond to the four vertexes, and in the generating of the synthesized image, a pixel value of a pixel positioned at an intersection point between a straight line that internally divides two sides of one of two pairs of opposite sides at a first ratio in a quadrangle including as vertexes the four corresponding points in the picked-up images and a straight line that internally divides two sides of the other of the two pairs at a second ratio is corrected by using a weighting average value in accordance with distances between the intersection point and the corresponding points for the correction value of each of the four corresponding points stored in the storage so as to obtain a pixel value of a pixel that will be positioned at an intersection point between a straight line that internally divides two sides of one of two pairs of opposite sides in the polygon at the first ratio and a straight line that internally divides two sides of the other of the two pairs at the second ratio, and thereby the synthesized image is obtained.

11. A computer-readable, non-transitory storage medium storing a program for causing a computer to execute a process of generating a synthesized image of a subject viewed from an arbitrary viewpoint from a plurality of picked-up images obtained by picking up images of surroundings of the subject in different directions, the process comprising:

calculating a correction value for a pixel value of a pixel that partially constitutes the picked-up images on the basis of a brightness of each of the plurality of picked-up images and storing the correction value in a storage of the computer for each of the pixels; and correcting a pixel value of the pixel that partially constitutes the picked-up images on the basis of a positional relationship of the pixel in the picked-up images, a correspondence relationship between the picked-up images and the synthesized image and the correction value stored in the storage, obtaining a pixel value of a pixel in the synthesized image that corresponds to the pixel that partially constitutes the picked-up images, and thereby generating the synthesized image.

12. The medium according to claim 11, wherein in calculation of the correction value, a correction value is calculated for a pixel value of a pixel positioned at a boundary between two picked-up images that will be adjacent when the synthesized image is generated.

13. The medium according to claim 12, wherein in calculation of the correction value, a value is calculated, as the correction value, by which brightness of the pixel positioned at the boundary between the two picked-up images is changed to an average value between brightnesses of the two picked-up images.

14. The medium according to claim 12, wherein the synthesized image is an image projected on a three-dimensional projection plane that is polygonal approximated by a plurality of polygons defined in a three-dimensional space, and in calculation of the correction value, calculation of the correction value is further performed for a pixel in the picked-up images that will be positioned at a vertex of the polygon when the synthesized image is generated, by performing liner interpolation of the correction value for the pixel positioned at the boundary based on a positional relationship of the pixel with the pixel positioned at the boundary in the three-dimensional space.

15. The medium according to claim 14, wherein the polygon is quadrangular, a vertex data table in which coordinate values of four vertexes of the polygon in the three-dimensional space and coordinate values in the picked-up images of four points, in the picked-up images, that correspond to the four vertexes are stored in an associated manner is stored in the computer in advance, and in the generating of the synthesized image, a pixel value of a pixel positioned at an intersection point between a straight line that internally divides two sides of one of two pairs of opposite sides at a first ratio in a quadrangle including as vertexes the four corresponding points in the picked-up images and a straight line that internally divides two sides of the other of the two pairs at a second ratio is corrected by using a weighting average value in accordance with distances between the intersection point and the corresponding points for the correction value of each of the four corresponding points stored in the storage so as to obtain a pixel value of a pixel that will be positioned at an intersection point between a straight line that internally divides two sides of one of two pairs of opposite sides in the polygon at the first ratio and a straight line that internally divides two sides of the other of the two pairs at the second ratio, and thereby the synthesized image is obtained.

* * * * *